SWEEP OSCILLATOR SYNCHRONIZING SYSTEM

Filed July 5, 1968 5 Sheets-Sheet 1

INVENTOR.
HANSEL B. MEAD

BY

Le Blanc & Shur
ATTORNEYS

SWEEP OSCILLATOR SYNCHRONIZING SYSTEM

Filed July 5, 1968 5 Sheets-Sheet 2

INVENTOR.
HANSEL B. MEAD

BY *Le Blanc & Shur*
ATTORNEYS

July 7, 1970 H. B. MEAD, JR 3,519,955

SWEEP OSCILLATOR SYNCHRONIZING SYSTEM

Filed July 5, 1968 5 Sheets-Sheet 3

INVENTOR.
HANSEL B. MEAD

BY

Le Blanc & Shur
ATTORNEYS

INVENTOR.
HANSEL B. MEAD
BY
Le Blanc & Shur
ATTORNEYS

INVENTOR
HANSEL B. MEAD
BY LeBlanc & Shur
ATTORNEYS 3,519,955

SWEEP OSCILLATOR SYNCHRONIZING SYSTEM

Hansel B. Mead, Jr., Eau Gallie, Fla., assignor to Teltronic Measurement Systems, Inc., New York, N.Y., a corporation of Delaware Filed July 5, 1968, Ser. No. 742,914
Int. Cl. H03b *23/00*
U.S. Cl. 331—178 17 Claims

ABSTRACT OF THE DISCLOSURE

Disclosed is a synchronization system for synchronizing an oscillator with a time reference. The synchronization system comprises a digital automatic frequency control loop utilizing a digital counter or divider, early and late gates, a memory bistable, a resettable timer and an analog-to-digital converter. The system senses the midpoint of an oscillator output cycle and compares its time of occurrence with the occurrence of a predetermined reference time pulse and an error signal corrects the oscillator frequency. The oscillator is swept linearly through a band of frequencies and correction is applied to the sweep slope.

This invention relates to a system for controlling the sweep time of a swept oscillator and more particularly synchronize the sweep of an oscillator with a data clock or accurate time base. In the present invention, a variable frequency local oscillator has its output swept through a frequency band approximately three to four megahertz wide. The system of the present invention provides synchronization for the oscillator of its output sweep so that it remains in step with a data clock or accurate time base. The oscillator completes a full sweep cycle approximately once each second. The system of the present invention is particularly suited as a synchronizing system for the swept oscillator used in receivers to monitor local oscillator signals from radio and particularly television sets to ascertain the tuning condition of the sets.

In assignee's U.S. Pat. No. 3,299,355, there is disclosed a system and method for monitoring radio and television receivers by detecting transmitted local oscillator signals. The system of that patent is particularly designed for use in an aircraft but may also be used in a tower in conjunction with an antenna which rotates or otherwise sweeps over the area to be monitored. A somewhat similar but modified receiver system particularly designed for noise-free reception from towers is disclosed in assignee's copending application Ser. No. 608,589, filed Jan. 11, 1967.

In those systems, the incoming signals from the local oscillators of radio and particularly television sets are combined in the receiver with a monitor receiver oscillator signal that is swept through a predetermined band of frequencies approximately 3.5 megahertz wide. In assignee's copending application Ser. No. 712,285, filed Mar. 11, 1968, there is disclosed an improved sweep oscillator for listening audience monitoring systems which produces a linear frequency scan versus time over a bandwidth in the neighborhood of 2–4 megahertz and at a relatively slow sweep rate, i.e., a sweep rate of about 1 sweep per 1.2 seconds.

The present invention provides a synchronization system for synchronizing a swept oscillator with a time base and particularly for synchronizing a swept oscillator of the type disclosed in assignee's above-mentioned application Ser. No. 712,285 with a data clock or other time base, such as a conventional 60-cycle power supply. It is desirable to have the sweep oscillator synchronized since the rating receiver data output is generated by the electronic scan of the swept local oscillator. The data storage and handling equipment accepting the receiver data output, to be accurate, should keep synchronized with the repeated scans of the oscillator. This is done by keeping the electronic scan rate at a constant multiple sweep rate in relation to the data handling equipment which is synchronized to a real time clock. It is likewise equally important that the electronic scan of the local oscillator cover the same frequency spectrum in successive scans. Since the oscillator frequency output varies linearly with time, both these functions can be accomplished by controlling a single parameter of the linear swept oscillator, namely, controlling the slope of its sweep.

The system of the present invention utilizes a digital AFC (automatic frequency control) loop. This control loop electrically adjusts the slope of the linear swept local oscillator. In the preferred embodiment described, the system is synchronized to the 60-hertz line frequency but if desired it can be synchronized to any data clock rate. The digital AFC loop utilizes a modified divide by 72 countdown chain, an early gate, a late gate, a 16-millisecond timer, a memory bistable, and a 16-level digital to analog converter. The output of the D/A converter controls the slope or rate of frequency sweep per unit time and has a control range of ±4%. This is adequate range to compensate for effects of component variations, temperature, and power supply voltage changes causing drifts in the swept local oscillator slope.

The synchronizing system uses two outputs from the swept local oscillator and compares these with a standard clock. The first output is the sweep retrace and the second output is the center frequency crossing referred to as the zero crossing. Ideally, it is desired that the sweep frequency be at its center frequency at the same time the divide by 72 counter is switching through half of its output cycle, and the retrace occurs at each cycle. This condition gives exact synchronization.

It is therefore one object of the present invention to provide a novel digital synchronization system for synchronizing a repetitive output device to a time base.

It is another object of the present invention to provide a synchronization system for synchronizing the output of a variable frequency oscillator.

Another object of the present invention is to provide an electronic synchronization circuit for modifying the slope of a variable frequency oscillator whose output periodically sweeps through a predetermined frequency band in a linear manner.

Another object of the present invention is to provide a sweep oscillator and synchronization system adapted to produce an output sweep closely synchronized to real time.

Another object of the present invention is to provide a synchronization system which operates on only one parameter of a variable frequency oscillator to provide a swept output that is accurate in bandwidth and synchronized to a reference time base.

These and further objects and advantages of the invention will be more apparent upon reference to the following specification, claims and appended drawings, wherein:

Figure 1:
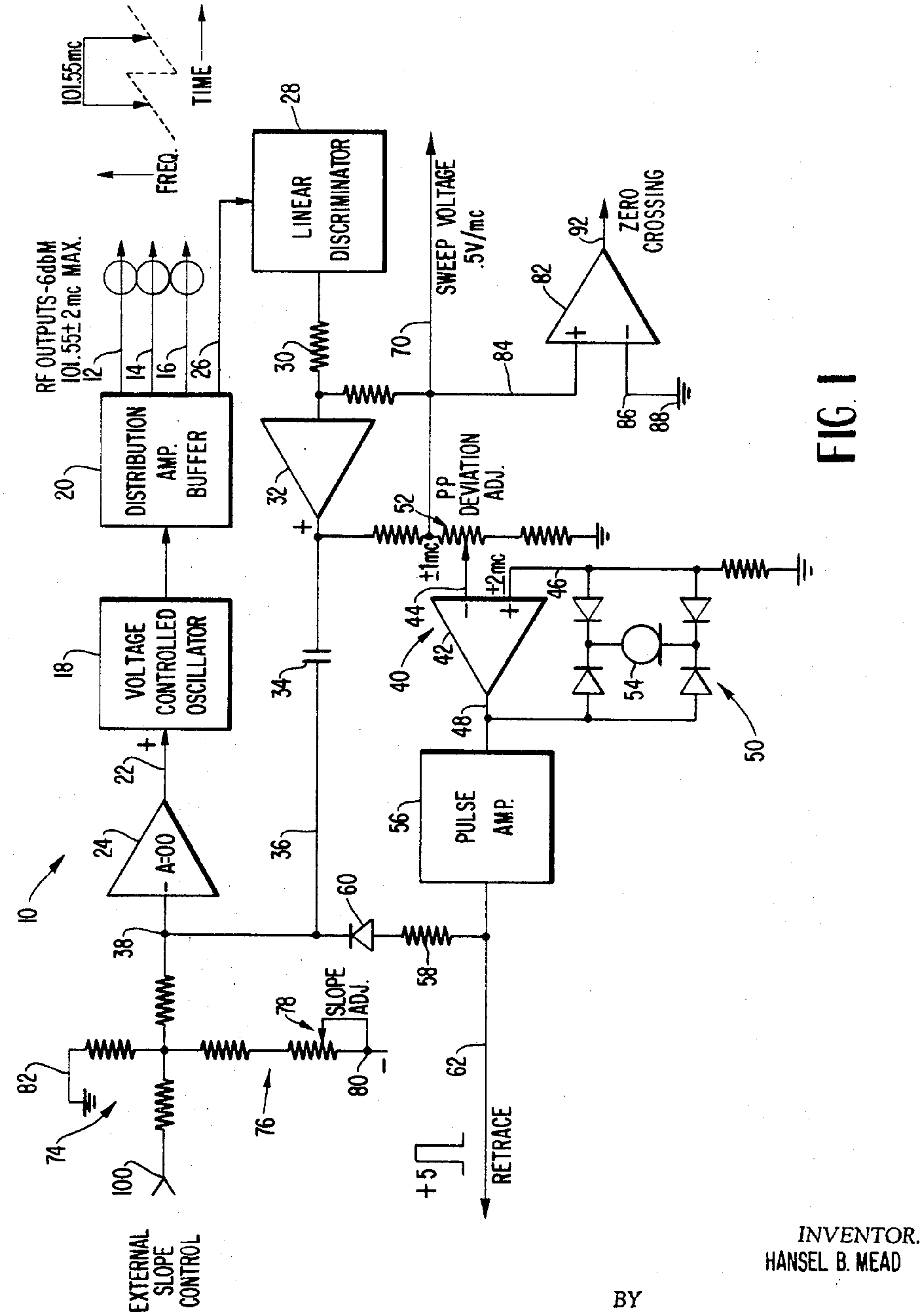
FIG. 1 is a block diagram of a linear swept oscillator constructed in accordance with the present invention and particularly suited for use in a television system monitor.

Referring to the drawings, FIG. 1 illustrates a linear frequency swept oscillator of the type shown and described in assignee's copending application Ser. No. 712,285, filed Mar. 11, 1968. This oscillator 10 is adapted to produce at three output terminals 12, 14, and 16 a variable frequency output having a center frequency of 101.55 megahertz and variable over a frequency band of approximately 2–4 megahertz, i.e., the sweep width of the output oscillator 10 is adjustable from $\pm1$ to $\pm2$ megahertz so as to readily cover the nominal 3.5 megahertz band within which almost all local oscillators tuned to the same television station normally operate.

Swept oscillator 10 includes a conventional voltage controlled oscillator 18 incorporating a reactance diode (varicap) which varies the output frequency of the oscillator over the range specified above. The signal from voltage controlled oscillator 18 passes to the output leads 12, 14 and 16 by way of a distribution or buffer amplifier 20. A control voltage is fed to the reactance diode of voltage controlled oscillator 18 by way of lead 22 from a direct coupled driver amplifier 24 having a high negative gain ideally approaching infinity.

A portion of the output from distribution amplifier 20 is fed by way of lead 26 to the input of a linear discriminator 28 having a responsive curve that is linear from $-1$ volt to $+1$ volt over a frequency range of from 99.55 megahertz to 103.55 megahertz and centered at 101.55 megahertz. The output of discriminator 28 is coupled through a resistor 30 to a discriminator matching amplifier 32 which reverses the polarity of the discriminator output and which, in turn, has its output connected to one plate of integrating capacitor 34. The other plate of capacitor 34 is connected by way of lead 36 to the input terminal 38 of driver amplifier 24. This amplifier, along with voltage controlled oscillator 18, distribution amplifier 20, linear discriminator 28, matching amplifier 32, and integrating capacitor 34, operates as a unit much in the manner of an integrating amplifier and particularly because of the high DC gain of direct coupled amplifier 24 in the integrating loop, the linearity of the ramp to be controlled is substantially entirely determined by the linearity of the discriminator 28.

Also connected to the output of matching amplifier 32 is a level detector generally indicated at 40 which comprises a level sensing operational amplifier 42, having a pair of input arms, i.e., negative arm 44 and positive arm 46, and its output 48 connected through a positive feedback network 50 to positive arm 46. Negative arm 44 of level sensing amplifier 42 is connected to the output of amplifier 32 through an adjustable potentiometer 52. Feedback network 50 comprises a semiconductor diode bridge in combination with a constant current diode 54. Level sensing amplifier 42 generates a retrace pulse which is passed through pulse amplifier 56 and applied to the input for driving amplifier 24 by way of resistor 58 and rectifier diode 60. The retrace pulse also appears on output lead 62.

A sweep voltage is generated on output lead 70 and may be used as desired. The circuit illustrated in FIG. 1 functions to maintain $\Delta F/\Delta T$ constant. However, the slope or angle of the positive ramp may be adjusted by varying the bias of driver amplifier 24. The resistive input network 74 is connected to the input of amplifier 24 for varying the slope and coupled to the input circuit is a bias circuit 76 including a variable potentiometer 78 connected between the negative side of a DC power supply 80 and the other side of the power supply or to ground as illustrated at 82. Movement of the wiper arm of potentiometer 70 varies the DC bias on amplifier 24 to manually change the slope of the positive ramp and thereby adjust the sweep frequency rate which is nominally in the neighborhood of one full sweep cycle per 1.2 seconds.

Connected to the output of linear discriminator 28 is a second level sensing amplifier 82 having a positive input arm 84 and a negative input arm 86 connected to system ground 88. Amplifier 82 produces an output pulse on its output lead 92 when the positive going ramp passes through the center frequency of 101.55 megahertz. That is, the voltage on output lead 92 goes positive when the potential on positive arm 84 passes through the ground potential level at which the other arm 86 is maintained. The output pulse on lead 92 is referred to as the zero crossing output pulse.

Figure 2:
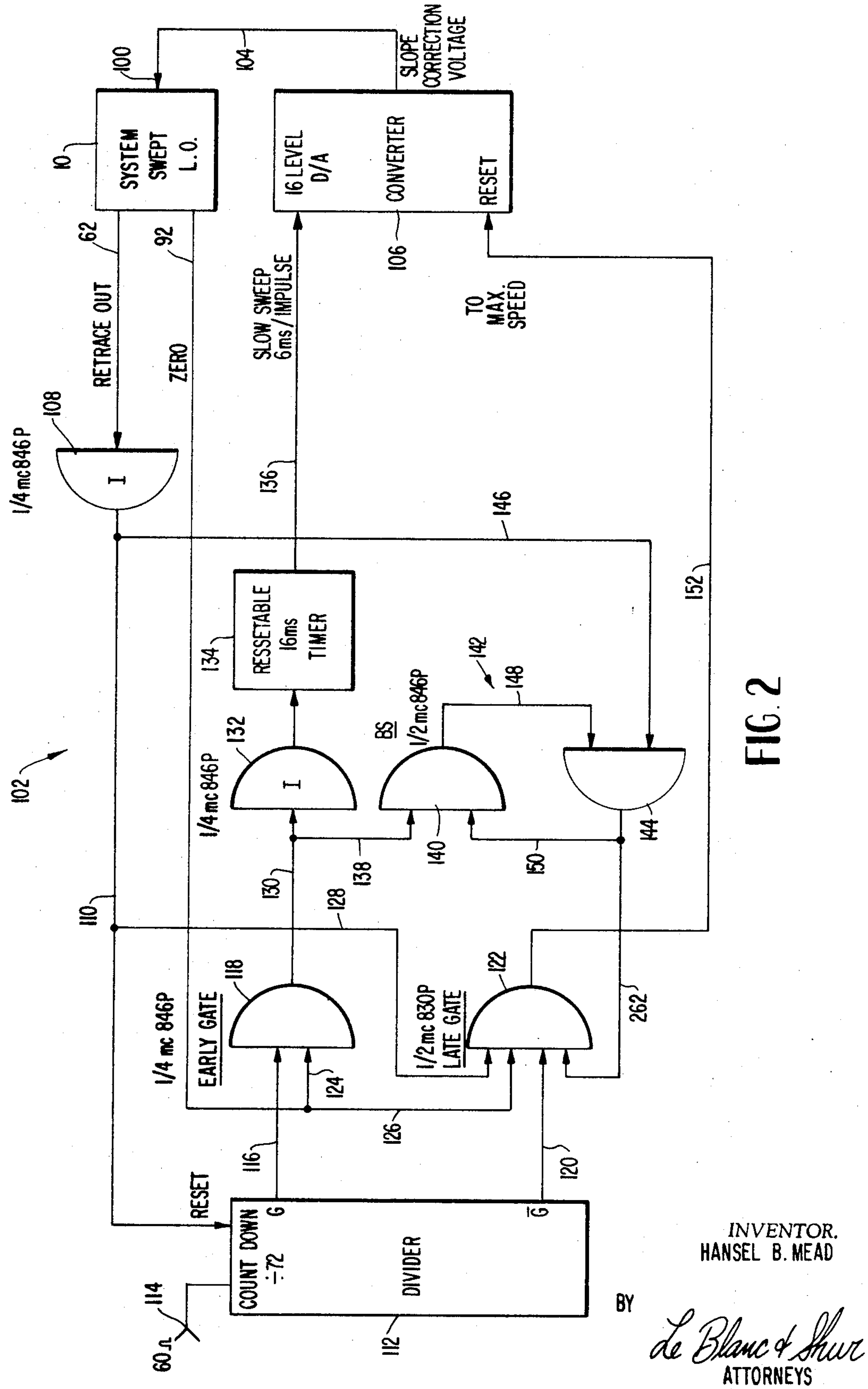
FIG. 2 is a block diagram of the overall monitoring system of the present invention incorporating the swept local oscillator of FIG. 1.

FIG. 2 is a simplified block diagram of the overall synchronization system of the present invention generally indicated at 102. The system includes the linear swept oscillator 10 of FIG. 1, illustrated in the upper right hand corner of FIG. 2, having the retrace pulse output lead 62 and zero crossing pulse output lead 92 with the external slope correction signal applied to the oscillator 10 by way of input terminal 100. The analog slope correction signal is applied to terminal 100 by way of lead 104 from a 16-level digital-to-analog converter 106 shown in detail in FIG. 4 and described in detail below. The retrace pulse on output lead 62 passes through an integrated circuit inverter 108 and from the inverter passes by way of lead 110 to a divide by 72 countdown counter or divider 112 shown in detail in FIG. 3 and also described in more detail below. Divider 112 is triggered or toggled from a suitable reference time base illustrated in FIG. 2 at 114 as a conventional 60-cycle AC line source.

Output lead 116 from divider 112 indicated as carrying the G output from the divider is connected to one input terminal of an integrated circuit early gate 118. The G-complement output lead 120 is similarly connected from divider 112 to one input of an integrated circuit late gate 122. The other input 124 of early gate 118 is connected to the zero crossing input lead 92 of swept oscillator 10. The zero crossing pulse is also fed by way of lead 126 to an input of late gate 122. A reset pulse from the swept oscillator 10 (retrace) by way of inverter 108 is supplied over lead 128 to another input of late gate 122.

The output of early gate 118 is coupled by way of lead 130 to an inverter 132 from which it passes to a resettable 16 millisecond timer 134 The output from timer 134 supplies sweep correction digital signals by way of lead 136 to the input of the digital-to-analog converter 106.

The output from early gate 118 is also supplied by way of lead 138 to one stage 140 of a bistable generally indicated at 142 also having a second integrated circuit stage 144. This latter stage receives a reset pulse from inverter 108 by way of lead 146 and the two stages are cross-connected by leads 148 and 150 in a conventional manner. Finally, the output from late gate 132 is fed by way of lead 152 to the digital-to-analog converter 106 and acts to reset the converter when the sweep rate of oscillator 10 becomes too slow.

Figure 3:
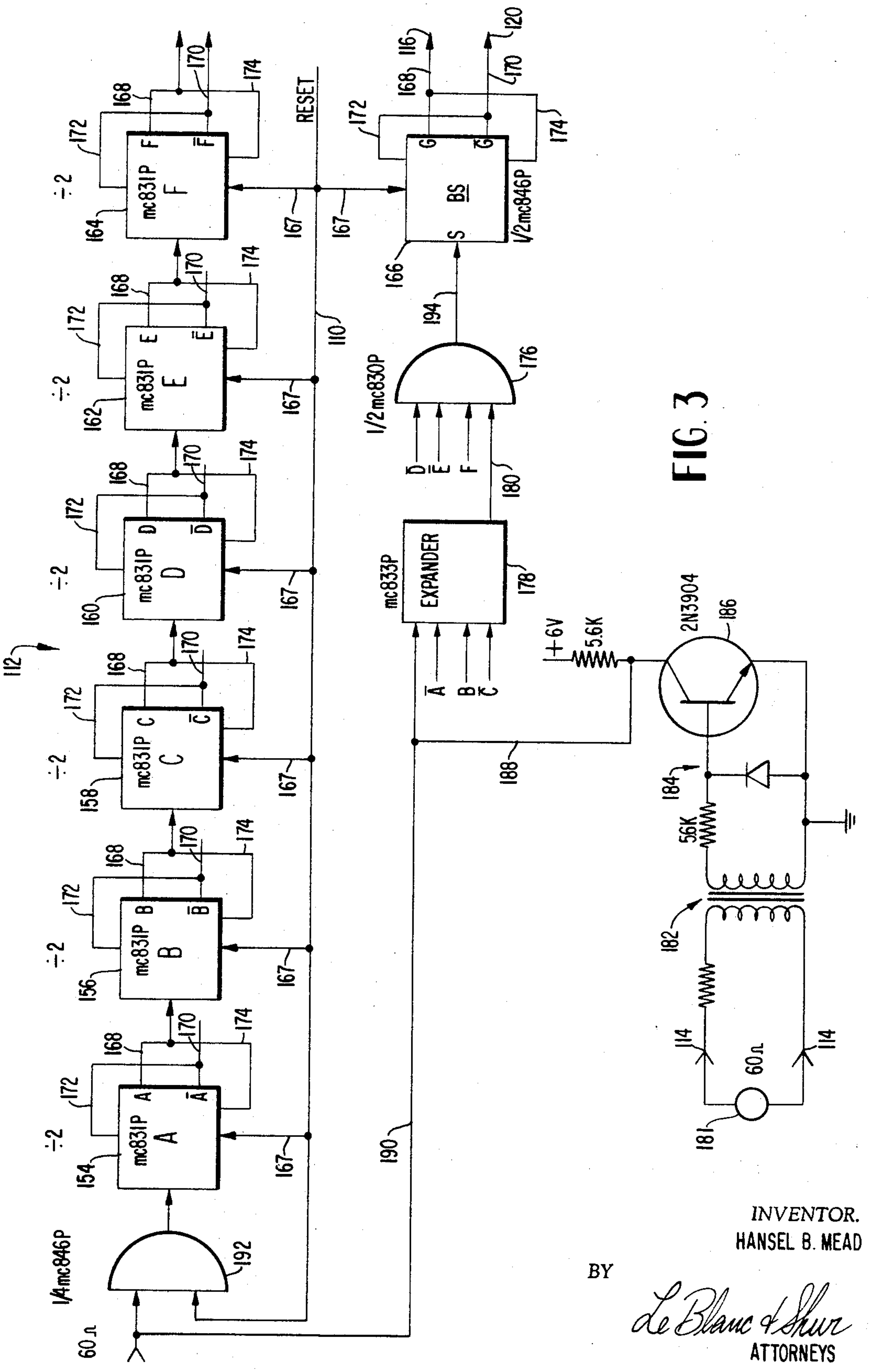
FIG. 3 is a block diagram of the divide by 72 counter incorporated in the synchronization system of FIG. 2.

FIG. 3 is a detailed block diagram of divider 112 of FIG. 2. The divider comprises seven identical integrated circuit flip-flops 154, 156, 158, 160, 162, 164, and 166. These flip-flops are labeled A, B, C, D, E, F, and G, respectively. The flip-flops or bistables each include a reset input 167 and each of the flip-flops includes a pair of outputs 168 and 170. The flip-flops are cross-coupled by leads 172 and 174 in the usual manner. They all act to divide their inputs by ½. The output 168 of the preceding stage is coupled to the following stage. Some of these outputs and some complementary outputs 170 are coupled to an integrated circuit NAND gate 176, or to a NAND gate input expander 178 connected to NAND gate 176 by lead 180. The complementary leads 170 are indicated by the same letter as the particular stage but with a bar above it. The output 168 from the last flip-flop stage 166 is connected to lead 116 of FIG. 2 and output 170 is connected to lead 120.

Divider 112 is triggered or toggled from a time base in the form of a 60 cycle line source 181 by way of input terminals 114. The 60 cycle signal passes through an isolation transformer 182 and through a shaper 184 including a junction transistor 186 where it is supplied by lead 188 to one input of NAND gate expander 178. The toggle signal is also supplied by way of lead 190 to one input of a NAND gate 192. The other input of this NAND gate is connected to reset lead 110 from inverter 108 of FIG. 2 as are the reset inputs 167 of the seven flip-flop stages of the divider. NAND gate 176, when toggled, triggers the last stage 166 of the counter by way of lead 194. NAND gate 176 is triggered when all the inputs to it and to the expander 178 indicated in the drawing (including the toggle pulse from shaper 186) are positive.

Figure 4:
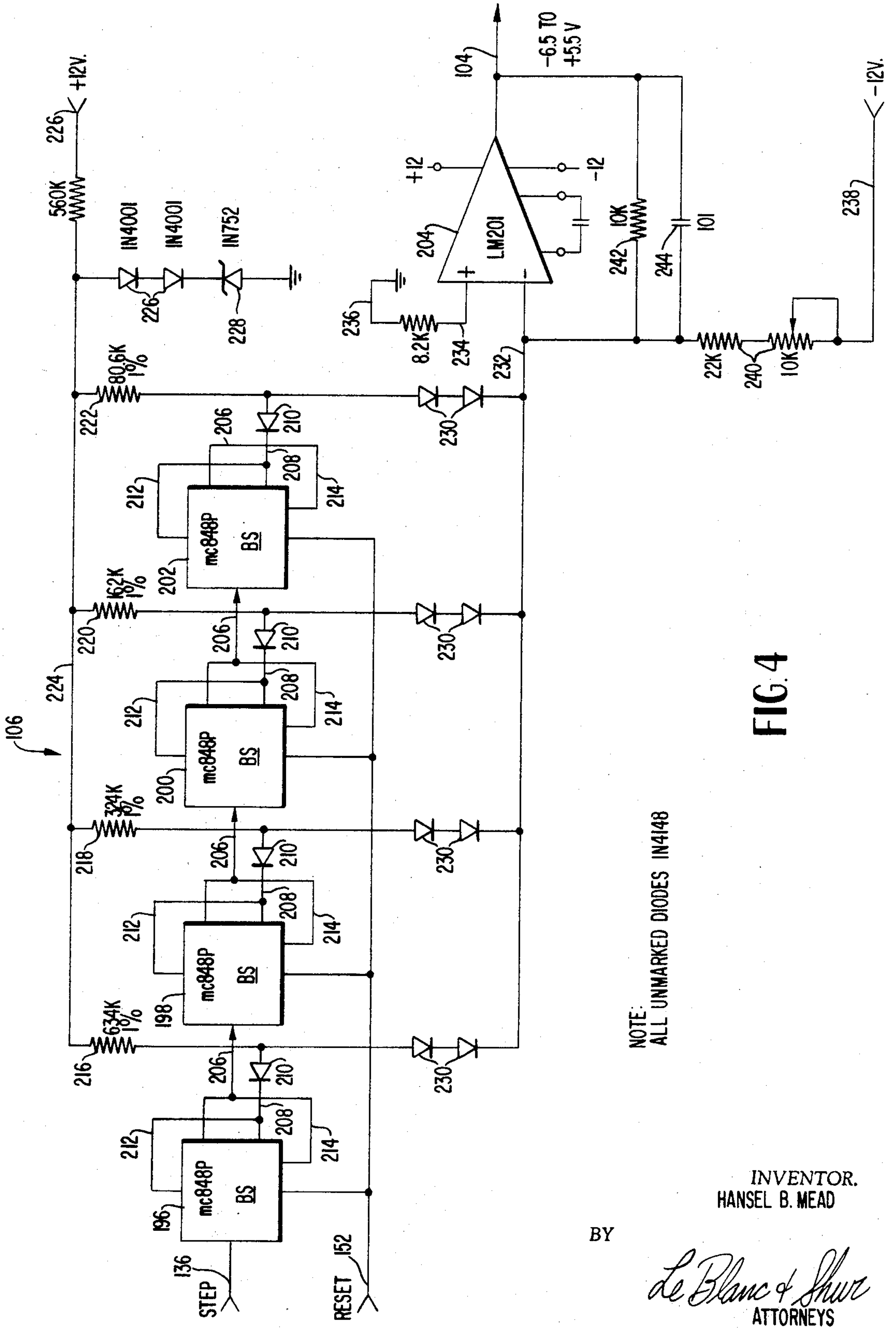
FIG. 4 is a block diagram of the digital-to-analog converter incorporated in the synchronization system of FIG. 2.

FIG. 4 is a detailed block diagram of the digital-to-analog converter 106 of FIG. 2. This is a 16-level D/A converter comprising four flip-flops or bistable stages 196, 198, 200, and 202 and on operational amplifier 204. The bistables are indentical to those shown and described in conjunction with the divider of FIG. 3 and are similarly cross-connected. The outputs 206 of preceding stages are coupled to following stages whereas the complementary outputs 208 are connected to semiconductor rectifier diodes 210. The integrated circuit flip-flops are cross-connected in the conventional manner by leads 212 and 214.

Diodes 210 are in turn connected to precision resistors 216, 218, 220, and 222, which vary in resistance such that each succeeding resistor has approximately ½ the resistance of the resistor connected to the preceding stage. In the embodiment illustrated, resistor 216 has a value of 634 kilohms, resistor 218 has a value of 324 kilohms, resistor 220 has a value of 162 kilohms, and resistor 222 has a value of 80.6 kilohms. The top end of each of these resistors is connected by way of lead 224 to a 12 volt DC power supply 226 and connected across the power supply, i.e., between the positive terminal and ground, are temperature compensating diodes 226 and a Zener diode 228 is provided for reference. The other ends of the resistors are connected through rectifier diodes 230 to the minus input arm 232 of operational amplifier 204. The positive arm 234 of the operational amplifier is connected to system ground at 236. Negative arm 232 is also connected to the negative side of a 12 volt DC power supply at 238 through resistors 240, one of which is illustrated as adjustable. Amplifier output lead 104 supplies a sweep correction signal to the input 100 of oscillator 10 of FIG. 2. Feedback around the amplifier from this output terminal is by way of resistor 242 and a ripple smoothing capacitor 244. Operational amplifier 204 produces an output analog signal on lead 104 which represents the sum of the currents supplied to its negative input arm 232 from precision resistors 216, 218, 220, and 222. The state of each bistable stage determines whether the current from the precision resistor flows through diodes 230 to summing amplifier 204 or through diode 210 into the bistable.

In operation and referring to FIG. 3, the 60 hertz clock frequency from source 181 toggles the divider 112 through the countdown process by way of NAND gate 192. The divider is reset by the retrace of the sweep on lead 110. The modified counter or divider has seven bistable flip-flop cells or stages utilizing integrated circuits. The first six stages form a normal 64-bit register. By the gating arrangement shown including gate expander 178 and NAND gate 176, the 36th bit is gated with the input 60 hertz toggle to set the seventh stage 166 of the divider by way of lead 194. Thus, the first ½ cycle of the seventh stage 166 is always the correct length of time. The switch back or reset of all stages is actuated by the sweep retrace.

Figure 5:
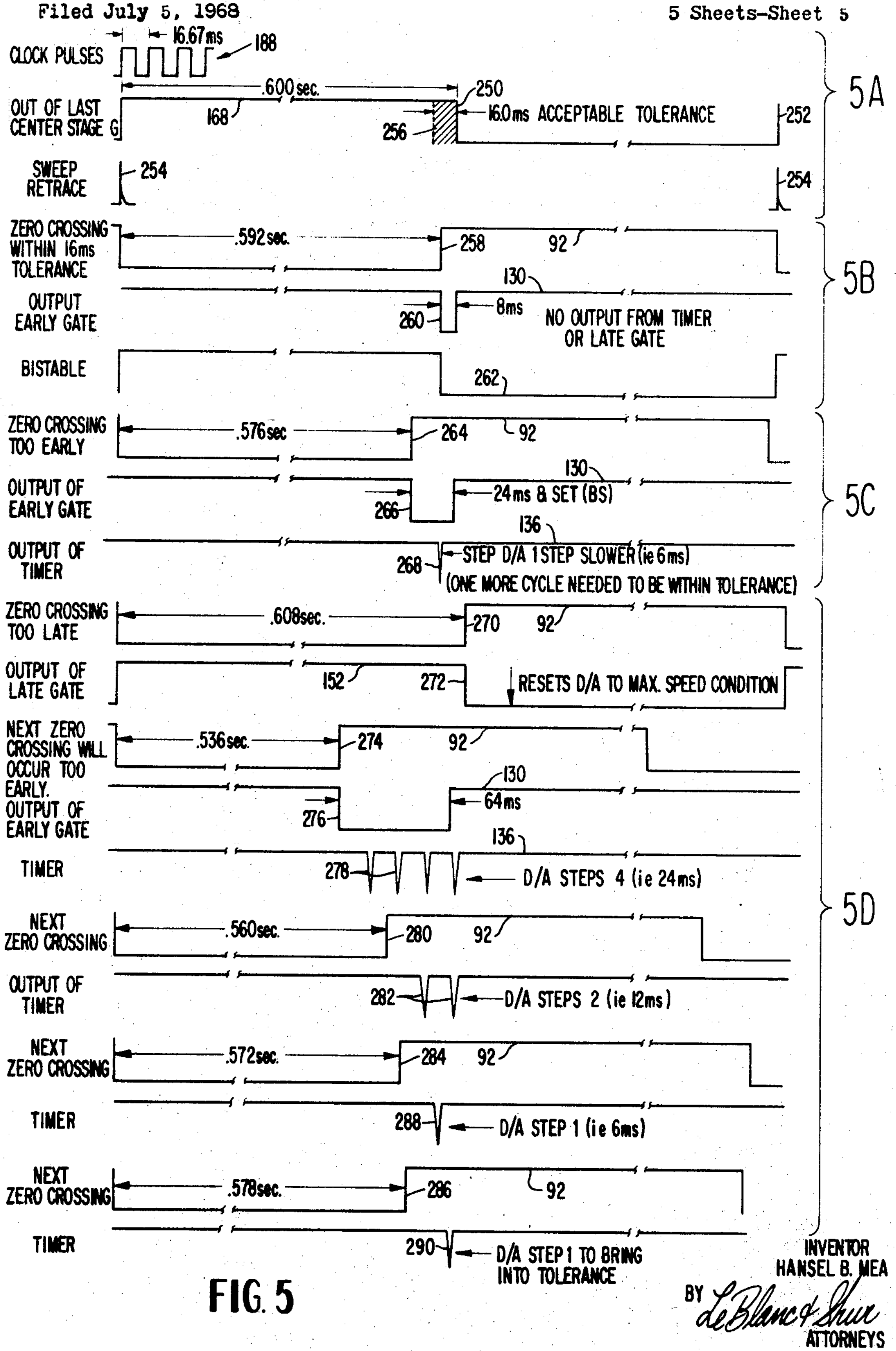
FIG. 5 shows timing diagrams and wave forms for the synchronization circuit of FIG. 2.

Referring to FIG. 5, the clock pulses out of shaper 186 are illustrated at 188 in that figure. These pulses from the 60 hertz line have a pulse repetition period of 16.67 milliseconds. The end of the 36th bit period from the 60 hertz source causes the last stage 166 to switch after .6 of a second and this changeover is illustrated at 250 in FIG. 5 for the wave form G out of the last stage of the divider on lead 168 of FIG. 5. This stage is reset at the end of a counting cycle as illustrated at 252 by a sweep retrace pulse 254 on lead 110. Resettable timer 134 of FIG. 2 provides at 16.0 millisecond acceptable tolerance in the system which is illustrated at 256.

The wave forms at 5A in FIG. 5 are general waveforms for the system. The group of waveforms illustrated at 5B are for the case in which the zero crossing is within the 16 millisecond tolerance illustrated at 256 in the waveforms 5A. Another group of waveforms illustrated in FIG. 5 and shown at 5C are for the condition when the zero crossing pulse from oscillator 10 on lead 92 in FIG. 2 is too early and the group of waveforms illustrated at 5D is for the case in which the zero crossing pulse is too late to be within the 16 millisecond tolerance.

Referring to the group of waveforms 5B, it is assumed that the sweep zero crossing pulse occurs 8 milliseconds before the seventh stage of the counter (divider) switches or .592 second from the beginning of a counting cycle. This zero crossing is within the 16 millisecond tolerance and is illustrated at 258 showing the zero crossing pulse appearing on lead 92. This causes the early gate to put out a signal on lead 130 as an 8 millisecond pulse, illustrated at 260 in the next waveform. The early gate pulse 260 sets the memory bistable 142 of FIG. 2 and inhibits late gate 122 by way of lead 262 in FIG. 2. The signal on this lead is illustrated in the next waveform.

Since the early gate output was less than 16 milliseconds long, there is no step pulse from the timer 134 to the D/A converter 106 and therefore no loop correction to the swept oscillator 10. The memory bistable 148 is also reset during sweep retrace by a signal from lead 146. Thus, if the early zero crossing is within 16 milliseconds of the 36th bit of the clock, it is said to be acceptable and no correction is required.

The group of waveforms at 5C in FIG. 5 are all for the condition when the zero crossing at 264 in the waveform 92 is too early and beyond the 16 millisecond tolerance. The first waveform illustrates a zero crossing occurring .576 second after the beginning of the counting cycle or 24 milliseconds too soon. In this case, the output from early gate 118 on lead 130 is a pulse 266, 24 milliseconds wide. Since this pulse is wider than the period of the resettable timer 134, an output pulse from the timer on lead 136 appears at 268, 16 milliseconds after the beginning of pulse 266. This pulse acts to step the D/A converter 106 one step to slow the sweep speed of swept oscillator 10 by 6 milliseconds. Thus, it can be seen that a zero crossing earlier than 16 milliseconds causes the timer 134 to step the D/A converter 106 in a number of steps, the number being how far the early crossing is in multiples of 16 milliseconds. To take another example, if the zero crossing is over 48 milliseconds early, this would produce 3 timer pulses to the D/A converter. Each step of the D/A converter 106, however, only slows the sweep speed by 6 milliseconds. Thus, several sweeps are required to finally get the zero crossing in the acceptable 16 millisecond tolerance region.

The group of waveforms at 5D in FIG. 5 show the condition when the zero crossing is too late. The example for this case shows the zero crossing for waveform 92 at 270 as occurring .608 second after the beginning of a count or 8 milliseconds too late. This produces an output from late gate 122 of FIG. 2 on lead 152 as illustrated at 272. The signal on lead 152 is applied to the reset terminal of the analog-to-digital converter 106 so that all stages of the converter illustrated in FIG. 4 are reset. Resetting of the D/A converter 106 produces a voltage at its output to swept oscillator 10 which causes the swept oscillator to have its maximum fast sweep speed. As a result, the next zero crossing, illustrated at 274, is far too early and is illustrated as occurring .536 second after the beginning of a count or 64 milliseconds early. This produces a pulse from the early gate on lead 130, 64 milliseconds wide, as illustrated at 276, and four impulses from resettable timer 134 on lead 136, as illustrated at 278, step converter 106 four steps and causes the sweep of oscillator 10 to slow down by 24 milliseconds. As a result, the following zero crossing, illustrated at 280, is only 40 milliseconds early. This produces two timer output pulses 282 which step the converter two steps and delays the sweep by an additional 12 milliseconds.

The following two zero crossovers are illustrated at 284 and 286 and these each produce the single step pulse 288 and 290 from the timer. Pulse 290 slows down the sweep by 6 milliseconds so that the sweep following the one causing that pulse is only 16 milliseconds early and therefore within the acceptable tolerance.

It is apparent from the above that the present invention provides an improved synchronization system for synchronizing in a digital manner any repetitive type output device and is particularly adapted for synchronizing a swept oscillator used in a television audience survey monitor. Since the swept oscillator possesses a linear slope with time, the oscillator can be controlled by varying only a single parameter, namely, the angle of the slope. Utilization is made of a zero crossover pulse corresponding to the center frequency of the oscillator which is used to trigger either an early or late gate and the oscillator retrace or return sweep is used to reset the synchronization counter or divider. The conditions of stability in the digital automatic frequency control loop are:

(1) The acceptance region is not less than ½ the clock period, i.e., in the embodiment illustrated 8.33 milliseconds.

(2) The digital level of correction is not greater than the acceptance region minus ½ the clock period, i.e., 16 milliseconds minus 8.33 milliseconds. That is, 7.66 milliseconds is greater than 6 milliseconds.

(3) Another speed correction sample cannot be taken until the previous stepped correction has had time to fully manifest itself.

It can be seen that since the sweep is not exactly synchronous with the clock frequency, the reset can occur anywhere in the clock cycle. By the way the counter is utilized, with the toggle NAND gate, the error for the 36th bit, as to when it should have happened, can amount to as much as ½ the clock period or 8.3 milliseconds. If the clock frequency was faster, this error would be greatly reduced. The acceptance region must therefore be greater than this (½ times clock time) and in fact must be greater than ½ times clock time plus the step level correction factor (8.33 milliseconds plus 6 milliseconds is less than 16 milliseconds). If this condition is not satisfied, the loop will be unstable and oscillate. It should be obvious that a correction sample should not be taken while the previous correction is still in process. This is satisfied in the present system since the new sample is not taken until the next local oscillator sweep cycle.

Inherent in the AFC loop is that there is always a small frequency error. This error is determined by the acceptance region (AR) time minus ½ times the clock period (CP) divided by ½ times the sweep period (SP) or $$\text{Error Maximum}=\frac{AR-{}^1\!/_2CP}{{}^1\!/_2SP}=\frac{.016-.0083}{.6}=1.2\%$$

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A synchronization system for synchronizing an oscillator with a time base comprising means coupled to said oscillator for comparing the time between two spaced points in a cycle of its output with a predetermined interval, and means coupled to said comparing means and responsive to a difference signal from said comparing means for changing the frequency of said oscillator in such a direction as to reduce said difference signal.

2. A system according to claim 1 wherein said points are spaced by a half cycle of said oscillator output.

3. A system according to claim 2 wherein said points represent the beginning and midpoint of an oscillator output.

4. A system according to claim 1 wherein said oscillator output comprises a sweep and retrace, said points comprising said retrace and a point on said sweep.

5. A system according to claim 4 wherein said point on said sweep is its midpoint.

6. A synchronization system comprising an oscillator having a cyclic output including a sweep and retrace, means coupled to said oscillator for producing a signal representative of the time between said retrace and a point on said sweep, means coupled to said signal producing means for comparing said signal with a reference time signal, and means coupling said comparing means to said oscillator for correcting the frequency of its output in such a direction as to reduce the output of said comparator.

7. A system according to claim 6 wherein said sweep is linear, the output of said comparator acting to change the slope of said sweep.

8. Apparatus according to claim 6 wherein said comparator produces a series of pulses representative of the difference between said signals, and a digital-to-analog converter coupling said comparator to said oscillator.

9. A synchronization system comprising an oscillator having a cyclic output including a sweep and retrace, a digital counter coupled to said oscillator, a time base coupled to said counter whereby said counter produces an output signal a predetermined time after the occurrence of an oscillator retrace, means coupled to said oscillator for producing a signal representative of a predetermined point of said sweep, a comparator coupled to said counter and said sweep signal producing means for comparing the time of occurrence of said signals, and means coupling said comparator to said oscillator for correcting the frequency of said oscillator in accordance with the time difference between said signals.

10. A system according to claim 9 wherein said oscillator comprises a sweep oscillator whose output sweeps through a predetermined band of frequencies.

11. A system according to claim 10 wherein said sweep is linear, said means coupling said comparator to said oscillator acting to change the slope of said sweep.

12. A system according to claim 9 wherein said comparator comprises a gate, a resettable timer coupled to the output of said gate for producing a series of pulses representative of the signal from said gate, and a digital to analog converter coupling said resettable timer to said oscillator.

13. A system according to claim 12 wherein said gate comprises an early gate, said comparator including a late gate coupled to said converter for resetting said converter to a maximum fast oscillator output condition.

14. A system according to claim 12 wherein said converter comprises a plurality of counting stages and a current summing amplifier.

15. A synchronization system comprising a swept oscillator whose output sweeps linearly through a band of frequencies 2 to 4 megahertz wide, a digital counter coupled to said oscillator, a pulse time source coupled to said counter, said counter producing an output signal a predetermined number of time base pulses subsequent to the retrace of said oscillator sweep, means coupled to said oscillator for producing a pulse at the midpoint of said sweep, early and late gates coupled to said counter and oscillator for producing an output signal representative of the time difference between said counter signal and said sweep midpoint signal, a resettable timer coupled to the output of said early gate for producing a series of pulses proportional in number to the time said midpoint pulse preceeds said counter signal, a resettable digital-to-analog converter coupling said timer to said oscillator whereby the output of said converter determines the slope of said oscillator sweep, and means coupling said late gate to said converter whereby said converter is reset to maximum fast condition whenever said midpoint pulse lags behind said counter signal.

16. A system according to claim 15 including a resettable bistable coupling said early and late gates whereby operation of said early gate disables said late gate until said bistable is reset by the retrace of said oscillator sweep.

17. A system according to claim 15 wherein said counter produces an output signal on the 36th pulse from said pulse time source.

References Cited

UNITED STATES PATENTS 3,364,437 1/1968 Loposer et al. _________ 331—4

JOHN KOMINSKI, Primary Examiner

U.S. Cl. X.R.

331—4; 332—19

PO-1050
(5/69)

UNITED STATES PATENT OFFICE
CERTIFICATE OF CORRECTION

Patent No. 3,519,955 Dated July 7, 1970

Inventor(s) HANSEL B. MEAD

It is certified that error appears in the above-identified patent and that said Letters Patent are hereby corrected as shown below:

Column 3, line 31, "responsive" should read -- response --. Column 5, line 20, "flip-flops" should read -- flip-flop --. Column 5, line 21, "on" should read -- an --. Column 6, line 7, "at" should read -- a --.

The inventor's name should read -- Hansel B. Mead --.

SIGNED AND SEALED
MAR 9 1971

(SEAL)
Attest:

Edward M. Fletcher, Jr.
Attesting Officer

WILLIAM E. SCHUYLER, JR.
Commissioner of Patents